United States Patent
Tomioka et al.

(10) Patent No.: US 9,989,142 B2
(45) Date of Patent: Jun. 5, 2018

(54) LINEAR ACTUATOR

(71) Applicant: HONDA MOTOR CO., LTD., Tokyo (JP)

(72) Inventors: Kazuki Tomioka, Wako (JP); Ryousuke Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 388 days.

(21) Appl. No.: 14/797,288

(22) Filed: Jul. 13, 2015

(65) Prior Publication Data

US 2016/0017965 A1 Jan. 21, 2016

(30) Foreign Application Priority Data

Jul. 15, 2014 (JP) .................................. 2014-145228

(51) Int. Cl.
*F16H 57/00* (2012.01)
*B60G 7/00* (2006.01)
*B60G 3/14* (2006.01)
*F16H 25/20* (2006.01)

(52) U.S. Cl.
CPC ........... *F16H 57/0006* (2013.01); *B60G 3/14* (2013.01); *B60G 7/001* (2013.01); *B60G 2200/132* (2013.01); *B60G 2200/4622* (2013.01); *B60G 2202/42* (2013.01); *B60G 2202/422* (2013.01); *B60G 2204/419* (2013.01); *B60G 2600/44* (2013.01); *F16H 2025/2081* (2013.01)

(58) Field of Classification Search
CPC ....... F16H 57/0006; B60G 3/14; B60G 7/001; B60G 2200/132; B60G 2200/4622
See application file for complete search history.

(56) References Cited

U.S. PATENT DOCUMENTS

| | | | | |
|---|---|---|---|---|
| 2,588,165 A | * | 3/1952 | Rossmann | ........... B60N 2/0232 5/18.1 |
| 2,945,691 A | * | 7/1960 | Swift | .................... E05F 11/405 464/88 |
| 6,490,942 B1 | * | 12/2002 | Meyer | .................. B60N 2/1615 297/344.14 |
| 7,562,594 B2 | * | 7/2009 | Nagai | ................. F16H 25/2015 188/129 |

FOREIGN PATENT DOCUMENTS

| | | |
|---|---|---|
| JP | 2004-257429 A | 9/2004 |
| JP | 2013-169918 A | 9/2013 |
| JP | 2013-248896 A | 12/2013 |

OTHER PUBLICATIONS

Notification of Reasons for Refusal dated Mar. 22, 2016, issued in counterpart Japanese Patent Application No. 2014-145228, with English translation. (6 pages).

* cited by examiner

*Primary Examiner* — David M Fenstermacher
(74) *Attorney, Agent, or Firm* — Westerman, Hattori, Daniels & Adrian, LLP

(57) ABSTRACT

A linear actuator includes: a pinion shaft coaxially coupled to a motor shaft; a driven gear that is engaged with a pinion gear on the pinion shaft; a nut that rotates with the driven gear; a feed screw mechanism that converts rotation movement of the nut into linear movement of a rod; a coupling part allowing an outer peripheral surface of the motor shaft to be serration coupled to an inner peripheral surface of a vertical hole in the pinion shaft; and a pressurizing unit that generates a pressure that axially acts between e motor shaft and the pinion shaft in the coupling part.

4 Claims, 7 Drawing Sheets

LINEAR ACTUATOR

CROSS REFERENCES TO RELATED APPLICATIONS

The present application claims priority under 35 U.S.C. § 119 to Japanese Patent Application No. 2014-145228, filed Jul. 15, 2014, entitled "Linear Actuator." The contents of this application are incorporated herein by reference in their entirety.

BACKGROUND

1. Field

The present disclosure relates to linear actuators.

2. Description of the Related Art

Japanese Unexamined Patent Application Publication No. 2013-248896 describes a rear toe actuator (a linear actuator) including a driven gear that is engaged with a driving gear (a pinion gear) formed on a shaft of a motor. A nut rotates with the driven gear, and the rotation of the nut causes linear movement of the rod. The rear toe actuator of the Japanese Unexamined Patent Application Publication No. 2013-248896 has a structure in which the shaft of the motor and the rod are not coaxial (i.e., the shaft of the motor and the rod are axially displaced from each other). Such a structure reduces the axial length of the rod and the size of the rear toe actuator.

SUMMARY

In the rear toe actuator of Japanese Unexamined Patent Application Publication No. 2013-248896, the driving gear formed on the shaft is caused to rotate with power from the motor. In accordance with the rotation of the driving gear, the driven gear engaged with the driving gear also rotates. In the rear toe actuator with such a configuration, when the shaft of the motor vibrates, engagement between the driving gear and the driven gear might cause noise (tooth hammer noise). The tooth hammer noise increases because of a size error of the gear or insufficient rigidity of a bearing unit. The rotating shaft easily vibrates in an axial direction, a rotation direction (whipping), and the direction orthogonal to the axial direction.

The rear toe actuator of Japanese Unexamined Patent Application Publication No. 2013-248896 is installed in an automobile and vibrates when the toe angle of a rear wheel is changed. Since the toe angle of the rear wheel is frequently changed in the automobile, tooth hammer noise generated by engagement between the driving gear and the driven gear in the rear toe actuator annoys passengers of the automobile. Thus, it is necessary to reduce tooth hammer noise generated by engagement between the driving gear and the driven gear.

The present application describes a linear actuator with a configuration that can reduce tooth hammer noise generated by engagement between a pinion gear rotating by a motor and a driven gear engaged with the pinion gear.

The present application describes a linear actuator including: a pinion shaft coaxially coupled to an output shaft of a motor; a driven gear that is engaged with a pinion gear on the pinion shaft; a nut that rotates with the driven gear; a feed screw mechanism that converts rotation movement of the nut into linear movement of a rod; a coupling part that allows an outer peripheral surface of the output shaft to be serration coupled to an inner peripheral surface of a vertical hole in the pinion shaft; and a pressurizing unit that generates a pressure axially acting between the output shaft and the pinion shaft in the coupling part.

In the linear actuator of the present application, the output shaft of the motor is serration coupled to the pinion shaft on which the pinion gear is provided. The pinion gear on the pinion shaft is engaged with the driven gear, and the driven gear rotates with rotation of the pinion shaft. Rotation movement of the nut that rotates with the driven gear is converted into linear movement of the rod. Thus, power from the motor is efficiently converted into linear movement of the rod. In the coupling part between the output shaft and the pinion shaft, a pressure axially acting between the output shaft and the pinion shaft is generated. A force corresponding to the pressure axially acts on the pinion shaft, thereby reducing axial vibrations. The reduction of axial vibrations in the pinion shaft reduces tooth hammer noise generated by engagement between the pinion gear and the driven gear.

In the coupling part, the pressure generated by the pressurizing unit causes the output shaft and the pinion shaft to repel each other axially. In the linear actuator of the present application, the pinion shaft is pressed to the direction away from the output shaft. In a case where the distal end of the pinion shaft is supported by the bearing, the pinion shaft is pressed against the bearing. Thus, the pinion shaft is stabilized, and axial vibrations are reduced.

The pressurizing unit is a cylindrical elastic member and has at least three ribs that rise from an outer peripheral surface of the pressurizing unit and linearly and axially extend, an outer diameter of the pressurizing unit including the at least three ribs is equal to an inner diameter of the vertical hole, and the pressurizing unit is housed in the vertical hole, pressed by the output shaft inserted into the vertical hole, and deformed under compression, thereby generating the pressure.

In the linear actuator of the present application, the pressurizing unit is an elastic member that is housed in a vertical hole of the pinion shaft and pressed by the output shaft to generate a pressure. The ribs are provided on the outer peripheral surface of the pressurizing unit, and the outer diameter including the ribs is equal to the inner diameter of the vertical hole. Thus, the ribs of the pressurizing unit housed in the vertical hole are in contact with the inner peripheral surface of the vertical hole. When the pressurizing unit is pressed by the output shaft in the vertical hole, portions of the pressurizing unit except the ribs are easily deformed under compression, thereby generating a pressure. That is, the presence of the ribs on the outer peripheral surface of the elastic member serving as the pressurizing unit facilitates generation of a pressure.

In the pressurizing unit, the at least three ribs are evenly spaced from each other in a circumferential direction. In the present application, the ribs are evenly spaced from each other on the outer peripheral surface of the pressurizing unit. Thus, the pressurizing unit is uniformly deformed under compression in the circumferential direction in the vertical hole, and generates a uniform pressure in the circumferential direction. The pinion shaft receives the pressure that is uniform in the circumferential direction. Thus, the pinion shaft is supported without being tilted relative to the axis.

The at least three ribs are three ribs. In the linear actuator of the present application, the three ribs are arranged at uniform intervals (at intervals of 120 degrees) on the outer peripheral surface of the pressurizing unit.

The present application describes a linear actuator with a configuration that can reduce tooth hammer noise generated by engagement between a pinion gear rotating by a motor and a driven gear engaged with the pinion gear.

DESCRIPTION OF THE PREFERRED EMBODIMENTS

Figure 1:
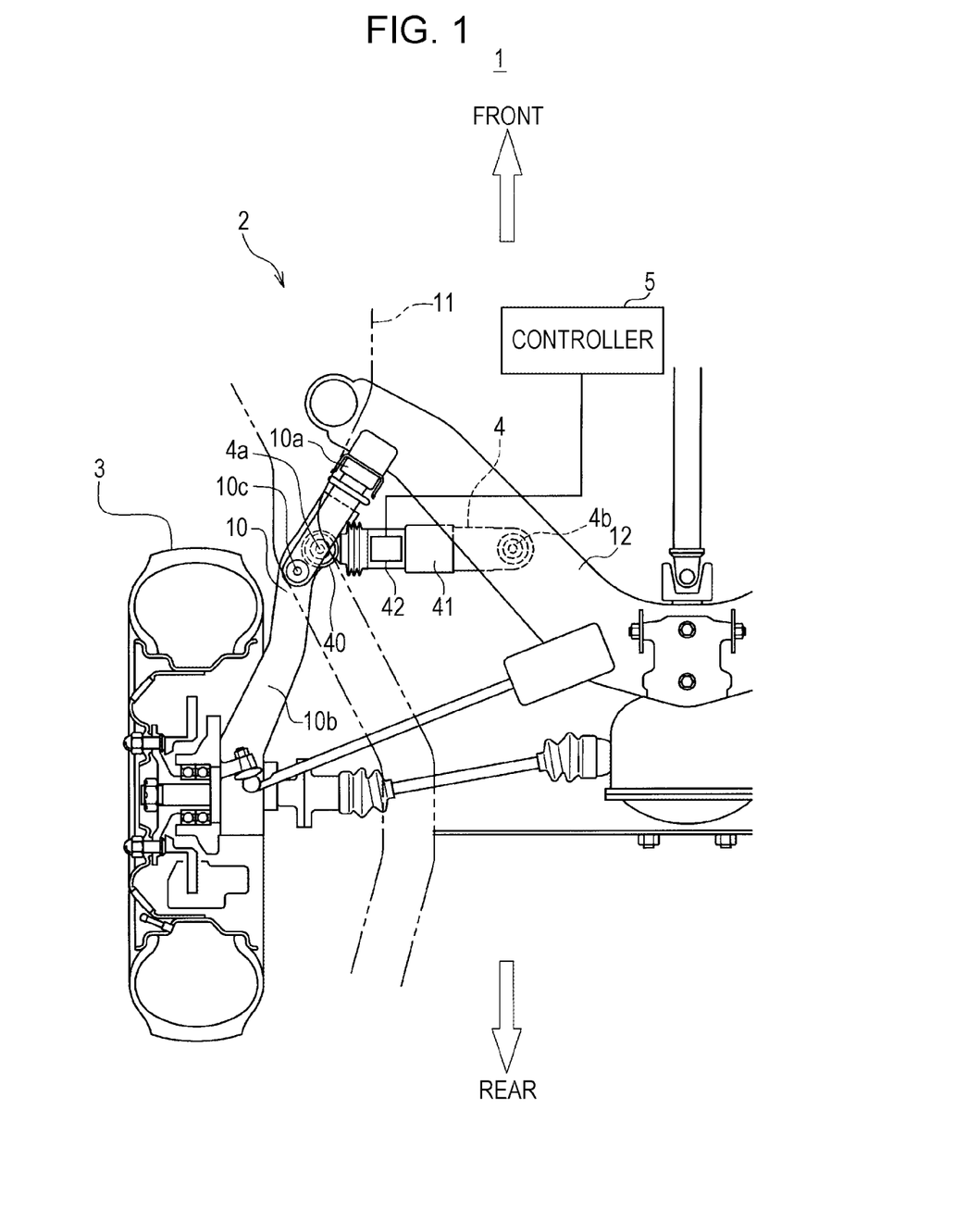
FIG. 1 illustrates a toe angle changer of a vehicle.

An embodiment of the present disclosure will be specifically described with reference to the drawings. FIG. 1 illustrates a toe angle changer of a vehicle. A toe angle changer 2 according to this embodiment changes a toe angle of a rear wheel 3 of a vehicle 1. The toe angle changer 2 illustrated in FIG. 1 is attached to the left rear wheel 3. Although not shown, components of a toe angle changer attached to a right rear wheel and components of the toe angle changer 2 attached to the left rear wheel 3 are symmetric.

As illustrated in FIG. 1, the rear wheel 3 of the vehicle 1 is attached to a rear end of a trailing arm 10. The trailing arm 10 extends in the front-rear direction of the vehicle 1, and the front end thereof is supported near an end of a cross member 12. The cross member 12 extends in the vehicle width direction of the vehicle 1, and an end of the cross member 12 is elastically supported by a rear frame 11. The rear frame 11 extends in the front-rear direction of the vehicle 1.

The trailing arm 10 includes a vehicle-body arm 10a and a wheel arm 10b. The vehicle-body arm 10a is fixed to the cross member 12. The rear wheel 3 is attached to the wheel arm 10b. The vehicle-body arm 10a and the wheel arm 10b are coupled together through a rotation shaft 10c. The rotation shaft 10c is an axial member extending vertically in the vehicle 1. The wheel arm 10b is coupled to the vehicle-body arm 10a such that the wheel arm 10b can rotate about the rotation shaft 10c. Since the vehicle-body arm 10a is fixed to the cross member 12, the wheel arm 10b can rotate relative to the cross member 12. Such a configuration enables the trailing arm 10 (the wheel arm 10b) to shift in the vehicle width direction.

The toe angle changer 2 includes a linear actuator 4 and a controller 5. The linear actuator 4 is attached to the wheel arm 10b and the cross member 12. The linear actuator 4 includes a rod 40, a body 41, and a motor 42. The rod 40 of the linear actuator 4 is coupled to the front end of the wheel arm 10b with a bush 4a interposed therebetween. The rod 40 can rotate around the bush 4a relative to the wheel arm 10b. The body 41 of the linear actuator 4 is coupled to the cross member 12 with a bush 4b interposed therebetween. The body 41 can rotate around the bush 4b relative to the cross member 12. The front end of the wheel arm 10b projects from the rotation shaft 10c. The linear actuator 4 is controlled by the controller 5.

The motor 42 of the linear actuator 4 is driven in response to an instruction from the controller 5. The rod 40 of the linear actuator 4 linearly moves as a result of driving of the motor 42. In accordance with the linear movement of the rod 40, the wheel arm 10b rotates about the rotation shaft 10c. When the wheel arm 10b rotates, the rear wheel 3 turns, and the toe angle of the rear wheel 3 changes.

Figure 2:
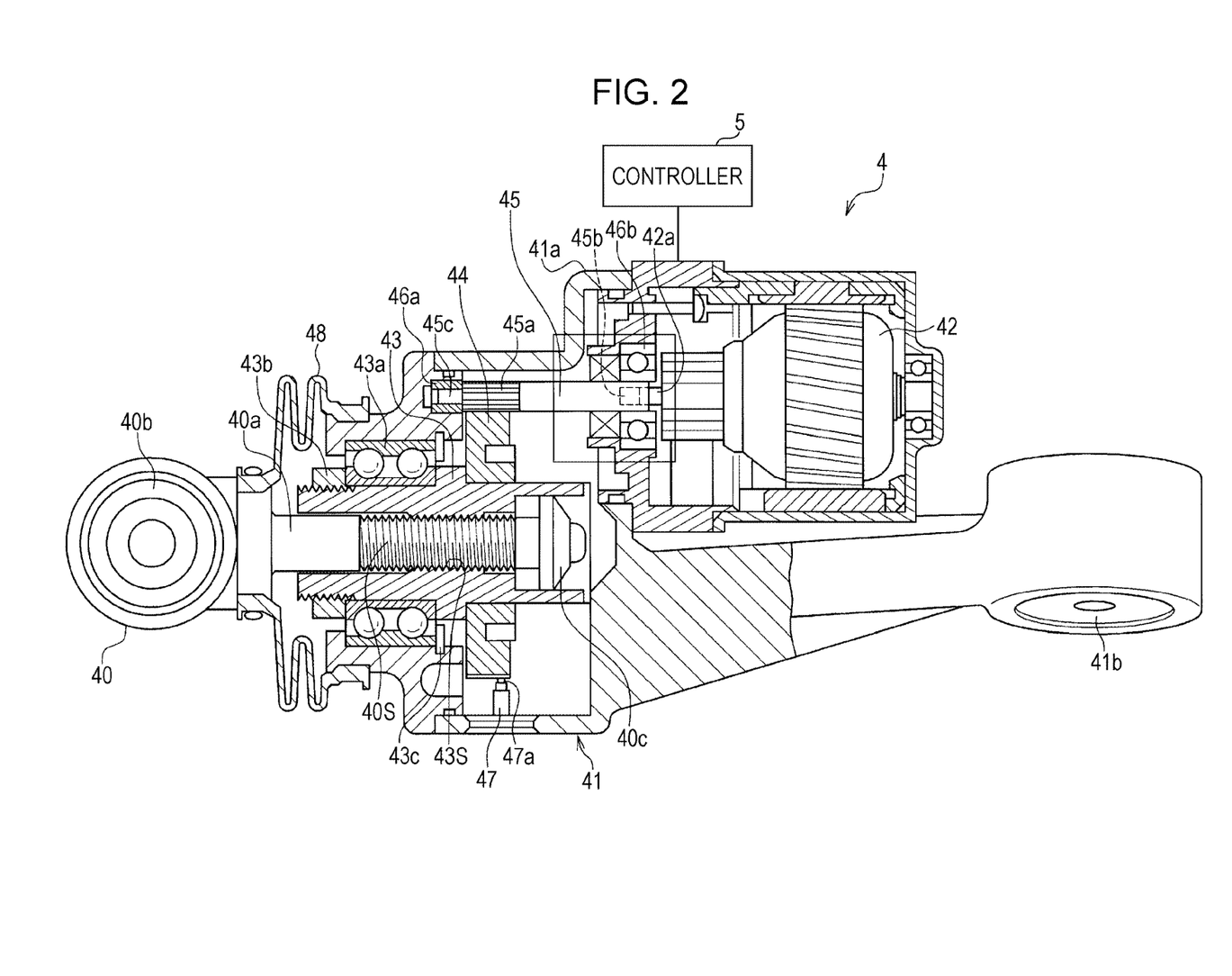
FIG. 2 is a cross-sectional view illustrating a structure of a linear actuator.

FIG. 2 is a cross-sectional view illustrating a structure of the linear actuator. As illustrated in FIG. 2, the linear actuator 4 includes the rod 40, the body 41, and the motor 42. A screw shaft 40a extends from the rod 40. The screw shaft 40a is housed in a housing 41a of the body 41. An external thread 40S on the screw shaft 40a is screwed into an internal thread 43S on a nut 43. The nut 43 is attached to the housing 41a with a bearing (an angular bearing 43a) interposed therebetween. The nut 43 is supported on the housing 41a such that the nut 43 can rotate about the shaft. The angular bearing 43a is fixed to the nut 43 with a ring member 43c (e.g., a C ring) attached to the housing 41a and a locknut 43b screwed to an outer peripheral portion of the nut 43. A stopper 40c is attached to an end of the screw shaft 40a. The diameter of the stopper 40c is larger than that of the internal thread 43S of the nut 43. The stopper 40c can prevent the rod 40 from being detached from the nut 43.

The internal thread 43S of the nut 43 that rotates about the axis of the housing 41a and the external thread 40S of the screw shaft 40a that is screwed into the internal thread 43S of the nut 43 constitute a feed screw mechanism. The feed screw mechanism converts rotation movement of the nut 43 into linear movement of the rod 40. Thus, the rod 40 linearly moves in accordance with rotation of the nut 43. With the linear movement of the rod 40, the amount of projection of the rod 40 from the housing 41a (the body 41) changes. The clearance between the rod 40 and the housing 41a is closed with a bellows 48. The bellows 48 is elastic, and expands or contracts in accordance with the linear movement of the rod 40. The bellows 48 prevents foreign substances from entering into the housing 41a.

The housing 41a has a knuckle (a body knuckle 41b). A bush 4b (see FIG. 1) is fitted into the body knuckle 41b. The linear actuator 4 is coupled to the cross member 12 (see FIG. 1) with the bush 4b fitted into the body knuckle 41b interposed therebetween.

An end of the rod 40 opposite to the screw shaft 40a has a knuckle (a rod knuckle 40b). A bush 4a (see FIG. 1) is fitted into the rod knuckle 40b. The linear actuator 4 is coupled to the wheel arm 10b (see FIG. 1) with the bush 4a fitted into the rod knuckle 40b interposed therebetween.

A driven gear 44 is formed on the outer periphery of the nut 43. The driven gear 44 is an external gear that rotates coaxially with the nut 43. The driven gear 44 is engaged with a pinion gear 45a formed on a pinion shaft 45 that rotates with power from the motor 42, and rotates in accordance with rotation of the pinion shaft 45. The nut 43 also rotates about the axis together with the driven gear 44.

The linear actuator 4 includes a solenoid 47. The solenoid 47 includes a solenoid pin 47a. The solenoid pin 47a linearly moves toward the driven gear 44 in accordance with an instruction from the controller 5. The solenoid pin 47a is fitted in a tooth groove on the driven gear 44 and stops rotation of the driven gear 44. When the rotation of the driven gear 44 stops, rotation of the nut 43 stops, and the linear movement of the rod 40 stops. That is, the rod 40 becomes locked. In this manner, the solenoid 47 locks the rod 40.

In the pinion shaft 45, a coupling part 45b is formed at an end of the pinion shaft 45 near the motor 42. The pinion shaft 45 is coupled to an output shaft (a motor shaft 42a) of the motor 42 at the coupling part 45b. The pinion shaft 45 is coaxially coupled to the motor shaft 42a. The coupling part 45b is supported on the housing 41a with a bearing (a ball bearing 46b). The coupling part 45b will be specifically described later. The end (a distal end 45c) of the pinion shaft 45 opposite to the coupling part 45b is supported on the housing 41a with a bearing (a needle bearing 46a) interposed therebetween.

In the linear actuator 4 of this embodiment, the motor shaft 42a and the rod 40 are displaced from each other. That is, the motor shaft 42a and the rod 40 are not coaxially disposed. Such a configuration reduces the axial length of the rod 40 and reduces the size of the linear actuator 4.

When the motor 42 is driven in response to an instruction from the controller 5, the pinion shaft 45, the driven gear 44, and the nut 43 rotate. The rotation movement of the nut 43 is converted into linear movement of the rod 40 by the feed screw mechanism. Thus, when the nut 43 rotates, the rod 40 linearly moves, and the rod knuckle 40b is displaced. With the displacement of the rod knuckle 40b, the wheel arm 10b (see FIG. 1) rotates about the rotation shaft 10c (see FIG. 1), and the rear wheel 3 (see FIG. 1) turns.

Figure 3A:
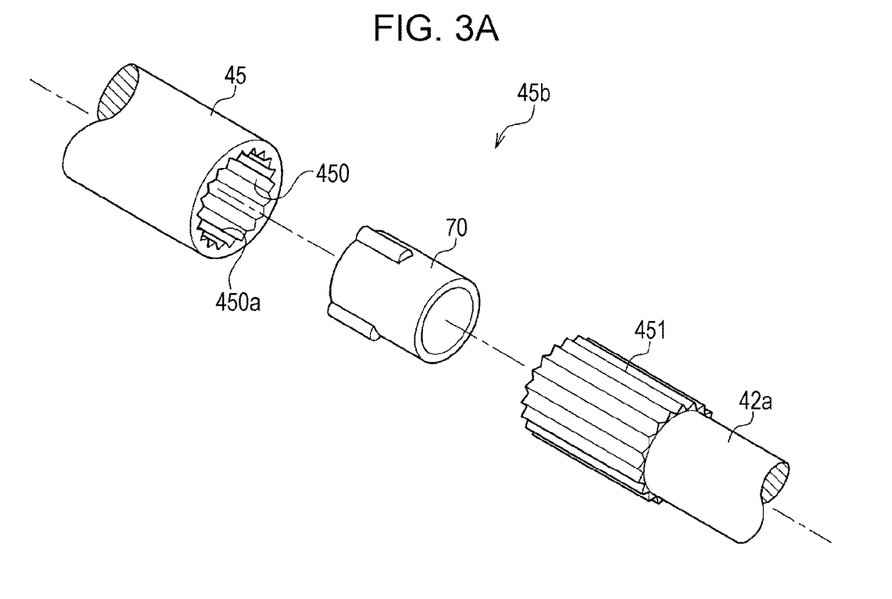
FIG. 3A is a perspective view of a coupling part of a pinion shaft.
Figure 3B:
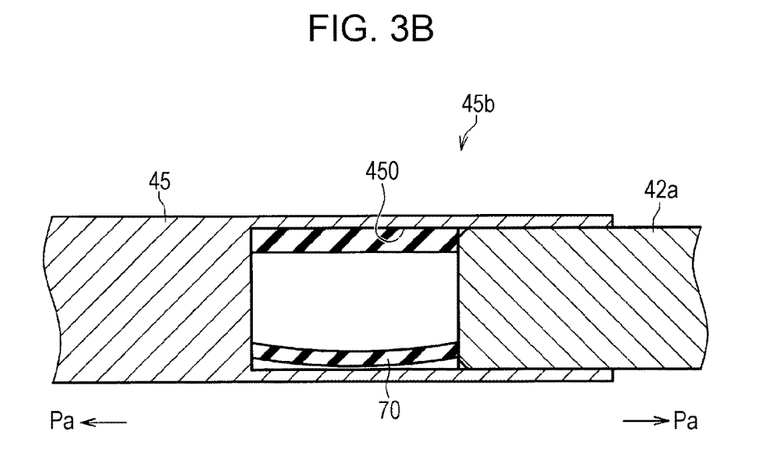
FIG. 3B is a cross-sectional view of the coupling part of the pinion shaft.

FIG. 3A is a perspective view of the coupling part of the pinion shaft. FIG. 3B is a cross-sectional view of the coupling part of the pinion shaft. As illustrated in FIG. 3A, a vertical hole 450 that axially extends is formed in the coupling part 45b of the pinion shaft 45. A pressurizing member 70 composed of a cylindrical elastic body as a pressurizing unit and a distal end of the motor shaft 42a are inserted into the vertical hole 450. A plurality of teeth 451 that axially extend are formed on a distal end of the outer peripheral surface of the motor shaft 42a. A plurality of grooves (vertical grooves 450a) that axially extend are formed on the inner peripheral surface of the vertical hole 450 of the pinion shaft 45. The pinion shaft 45 and the motor shaft 42a are coupled to each other with the vertical grooves 450a of the vertical hole 450 being engaged with the teeth 451 of the motor shaft 42a inserted into the vertical hole 450.

This configuration of the coupling part 45b causes the outer peripheral surface of the motor shaft 42a to be serration coupled to the inner peripheral surface of the vertical hole 450 on the pinion shaft 45. In the coupling part 45b, the teeth 451 are engaged with the vertical grooves 450a between the outer peripheral surface of the motor shaft 42a and the inner peripheral surface of the vertical hole 450. Thus, no slipping occurs between the outer peripheral surface of the motor shaft 42a and the inner peripheral surface of the vertical hole 450. Thus, power from the motor 42 (see FIG. 2) is efficiently transferred to the pinion shaft 45 through the teeth 451 and the vertical grooves 450a.

The pressurizing member 70 is inserted into the vertical hole 450 of the pinion shaft 45. The pressurizing member 70 is elastic in the axial direction of the pinion shaft 45. For example, the pressurizing member 70 may be a cylindrical member (an elastic member) made of an elastic material such as rubber.

As illustrated in FIG. 3B, the pressurizing member 70 that is the elastic member is housed within an inner space defined by the inner surface of the vertical hole 450 and a distal end of the motor shaft 42a in a state where the pressurizing member 70 is axially pressed by the motor shaft 42a inserted into the vertical hole 450 and is deformed under compression in the vertical hole 450. In the coupling part 45b, an axially acting pressure occurs between the motor shaft 42a and the pinion shaft 45 in the deformed pressurizing member 70, and the pinion shaft 45 and the motor shaft 42a repel each other axially. Repulsive forces Pa in opposite directions along the axis are generated on the pinion shaft 45 and the motor shaft 42a.

Figure 4A:
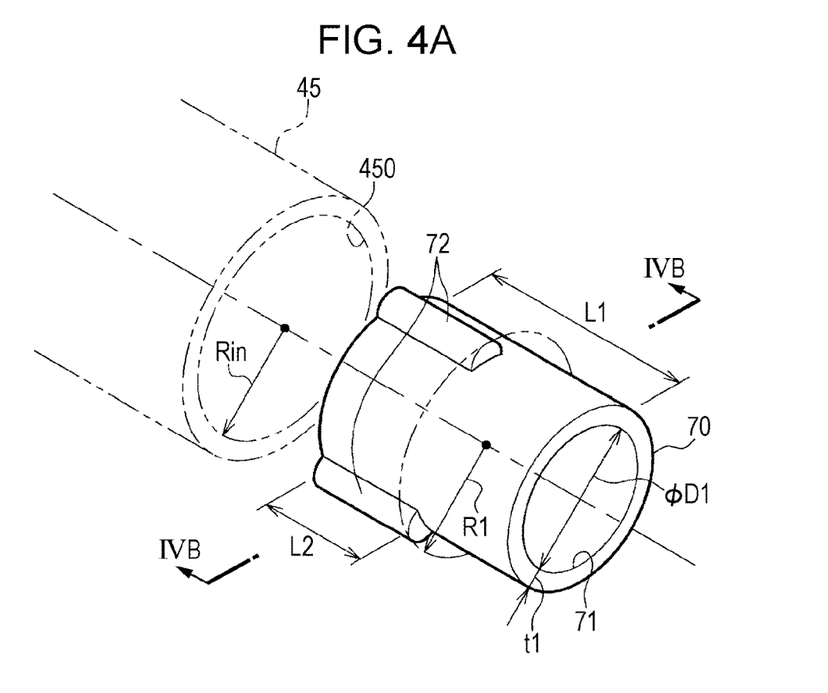
FIG. 4A is a perspective view of a pressurizing unit.
Figure 4B:
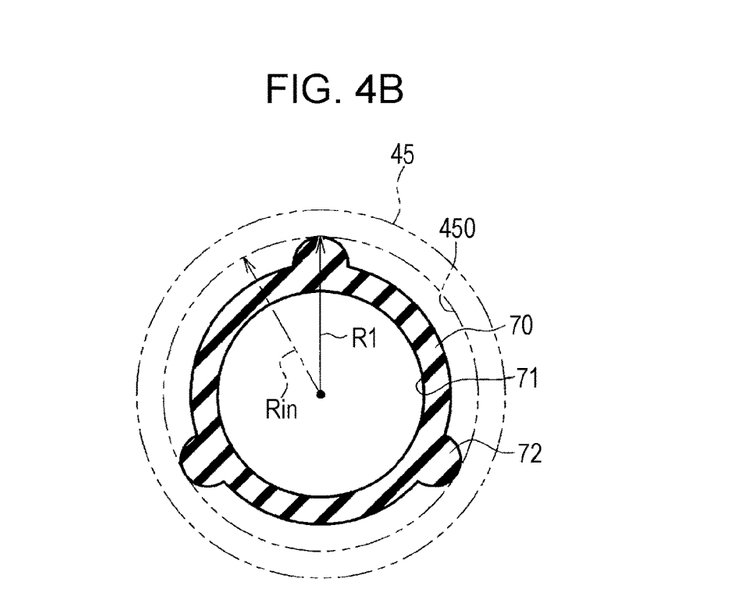
FIG. 4B is a cross-sectional view taken along line IVB-IVB in the pressurizing unit.

FIG. 4A is a perspective view of the pressurizing unit. FIG. 4B is a cross-sectional view of the pressurizing unit taken along line IVB-IVB. As illustrated in FIGS. 4A and 4B, the pressurizing member 70 of this embodiment is cylindrical and has a through hole 71 penetrating through the center of the pressurizing member 70. Ribs 72 that axially extend are formed on the outer periphery of the pressurizing member 70. The ribs 72 rise from the outer peripheral surface of the pressurizing member 70 and extend in lines (ridges) along the shaft. The pressurizing member 70 preferably has three or more ribs 72. The ribs 72 are evenly (equiangularly) spaced from each other along the circumferential direction of the pressurizing member 70. For example, in the pressurizing member 70 having three ribs 72, the ribs 72 are arranged at intervals of 120 degrees along the circumferential direction.

In addition, in the pressurizing member 70, the outermost diameter (radius R1) extending from the center and including one of the ribs 72 is equal to the inner diameter (radius Rin) of the vertical hole 450 formed in the pinion shaft 45 (i.e., radius R1=radius Rin). The ribs 72 of the pressurizing member 70 inserted into the vertical hole 450 of the pinion shaft 45 contact the inner peripheral surface of the vertical hole 450. When the motor shaft 42a (see FIG. 3A) is inserted into the vertical hole 450 of the pinion shaft 45, the pressurizing member 70 is pressed by the pinion shaft 45. At this time, in the pressurizing member 70, a portion of the pressurizing member 70 that is not in contact with the inner peripheral surface of the vertical hole 450 is easily deformed under compression, and thereby, generates an elastic force. This elastic force puts a pressure on the motor shaft 42a and the pinion shaft 45, and as illustrated in FIG. 3B, the repulsive forces Pa are generated on the pinion shaft 45 and the motor shaft 42a.

In addition, in the pressurizing member 70, the ribs 72 are evenly (equiangularly) spaced apart from each other in the circumferential direction. In a case where the pressurizing member 70 has three ribs 72, the ribs 72 are arranged at intervals of 120 degrees. Thus, the pressurizing member 70 is evenly deformed under compression in the circumferential direction in the vertical hole 450, and generates an elastic force (a pressure) that is uniform in the circumferential direction. The pressure that is uniform along the circumferential direction is input to the pinion shaft 45, and the pinion shaft 45 does not tilt relative to the axis.

The shape and size of the pressurizing member 70 are preferably determined in accordance with the repulsive forces Pa generated on the pinion shaft 45 and the motor shaft 42a (see FIG. 3A). The axial length (total length L1), the size (inner diameter φD1) of the through hole 71, and the thickness (wall thickness t1) of the pressurizing member 70 are preferably determined such that desirable repulsive forces Pa can be generated when the pressurizing member 70 is deformed under compression in the vertical hole 450. For example, the pressurizing member 70 may include no through hole 71. The number and the shape (e.g., axial rib length L2) of the ribs 72 are preferably determined such that desirable repulsive forces Pa can be generated. For example, in the pressurizing member 70, the axial length (rib length L2) of the ribs 72 may be equal to total length L1 (i.e., total length L1=rib length L2).

Figure 5:
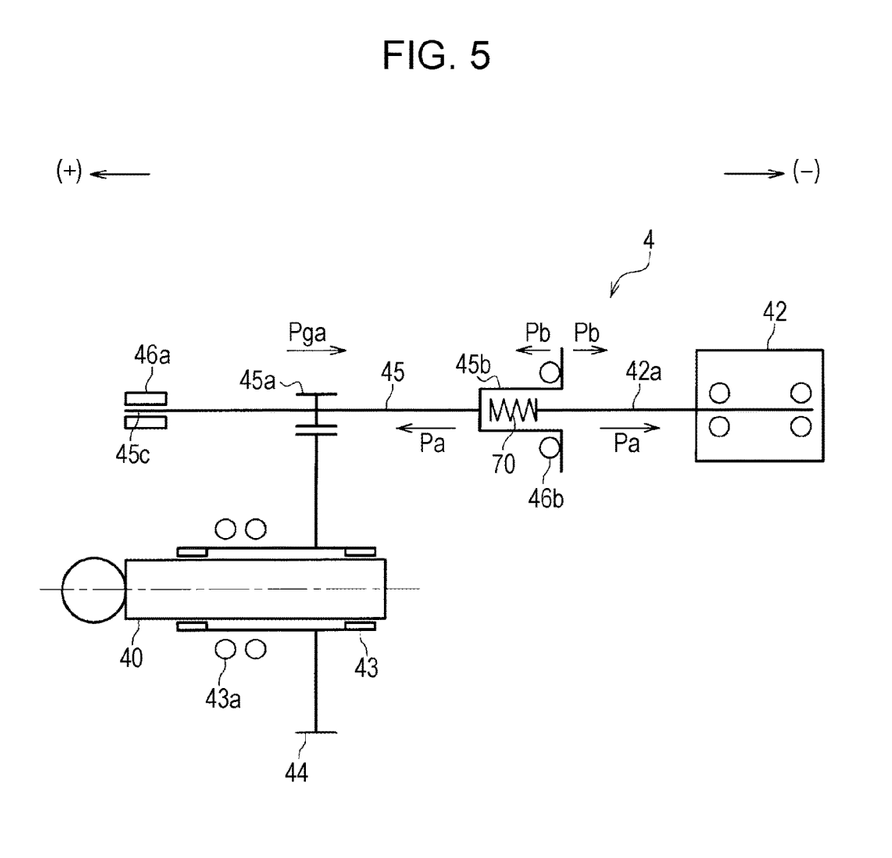
FIG. 5 schematically illustrates the linear actuator.

FIG. 5 schematically illustrates the linear actuator. As illustrated in FIG. 5, the coupling part 45b of the pinion shaft 45 includes the pressurizing member 70, and thus, repulsive forces Pa that are opposite to each other relative to the axis are generated on the pinion shaft 45 and the motor shaft 42a, respectively. A gear repulsive force Pg (see FIG. 6A) from the driven gear 44 acts on the pinion gear 45a. In a case where the pinion gear 45a stops and does not transmit any force to the driven gear 44, an axial component Pga of the gear repulsive force Pg is zero. At this time, a compressive force Pb that is equal to the repulsive forces Pa axially acts between the coupling part 45b of the pinion shaft 45 and the ball bearing 46b (i.e., repulsive force Pa=compressive force Pb). The axial component Pga of the gear repulsive force Pg is an axial component of the pinion shaft 45.

In a case where the pinion gear 45a rotates and transmits power to the driven gear 44, the axial component Pga of the gear repulsive force Pg (see FIG. 6A) is positive or negative. As illustrated in FIG. 5, in this embodiment, the side near the needle bearing 46a is positive (+) and the side near the ball bearing 46b is negative (−) along the axis of the pinion shaft 45. In a case where the repulsive force Pa is sufficiently greater than the axial component Pga, the resultant force of the compressive force Pb and the axial component Pga is equal to the repulsive force Pa (i.e., repulsive force Pa=compressive force Pb+axial component Pga). At this time, the compressive force Pb always axially acts between the coupling part 45b of the pinion shaft 45 and the ball bearing 46b along the axis of the pinion shaft 45. Thus, axial displacement of the pinion shaft 45 is reduced. That is, since the coupling part 45b includes the pressurizing member 70, axial displacement of the pinion shaft 45 is reduced, and as a result, axial vibration of the pinion shaft is reduced.

Figure 6A:
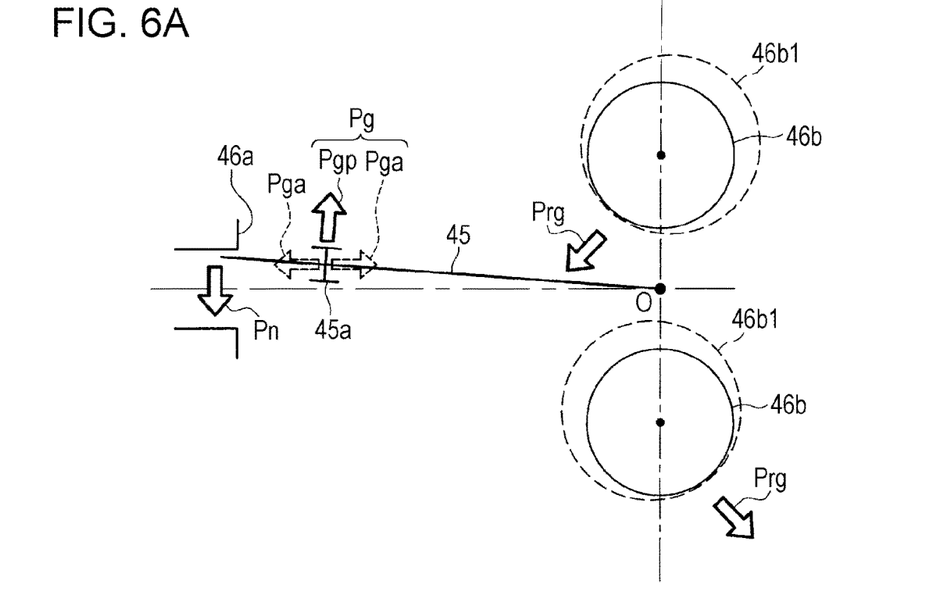
FIG. 6A schematically illustrates an axial quadrature component of a gear repulsive force acting on a pinion gear in a typical example in which a pinion shaft includes no pressurizing unit.
Figure 6B:
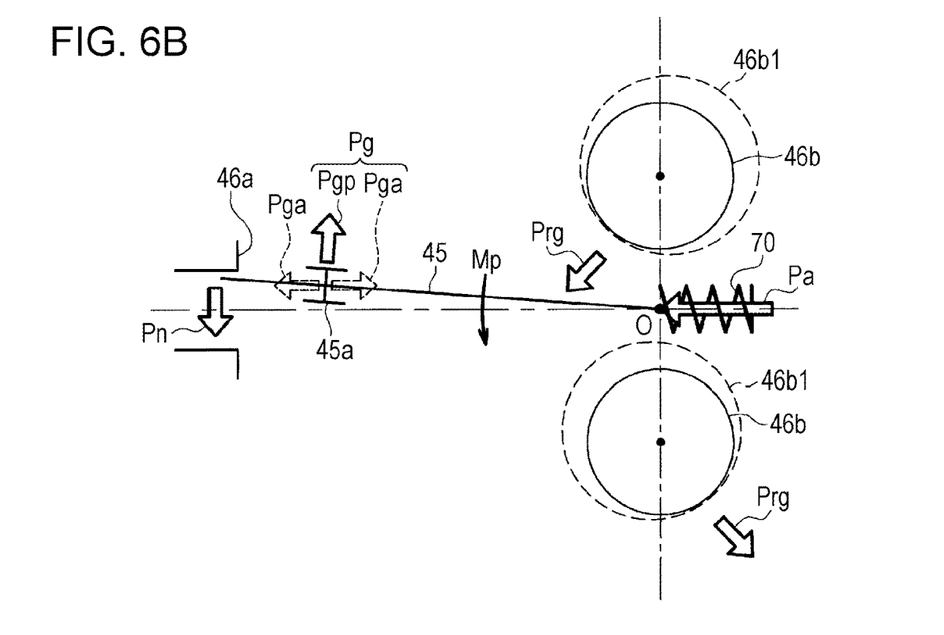
FIG. 6B schematically illustrates an axial quadrature component of a gear repulsive force acting on a pinion gear in an embodiment in which a pinion shaft includes a pressurizing unit.

FIGS. 6A and 6B schematically illustrate an axial quadrature component of a gear repulsive force acting on the pinion gear. FIG. 6A illustrates a typical example in which a pinion shaft includes no pressurizing unit. FIG. 6B illustrates this embodiment in which the pinion shaft includes the pressurizing unit.

As illustrated in FIG. 6A, the gear repulsive force Pg from the driven gear 44 (see FIG. 5) acts on the pinion gear 45a. The gear repulsive force Pg is divided into the axial component Pga and the axial quadrature component Pgp described above. The axial quadrature component Pgp is a component in the direction orthogonal to the axial direction of the pinion shaft 45.

The ball bearing 46b is configured such that a variation in a degree corresponding to specific backlash occurs with respect to a holder 46b1. A predetermined degree of backlash occurs between the pinion shaft 45 and the needle bearing 46a. When the gear repulsive force Pg acts, the pinion shaft 45 is slightly tilted because of backlash of the ball bearing 46b and the needle bearing 46a.

As illustrated in FIG. 6A, a needle counterforce Pn generated on the needle bearing 46a, a bearing counterforce Prg and a gear repulsive force Pg generated on the ball bearing 46b act on the pinion shaft 45. Backlash of the needle bearing 46a is larger than that of the ball bearing 46b and the rigidity of the needle bearing 46a is smaller than that of the ball bearing 46b. Thus, the needle bearing 46a can be easily deformed. Thus, the pinion shaft 45 becomes greatly displaced at the needle bearing 46a. As a result, when the gear repulsive force Pg (especially the axial quadrature component Pgp) occurs in accordance with engagement variation between the pinion gear 45a and the driven gear 44 (see FIG. 5), a large variation in displacement occurs in the needle bearing 46a. Noise generated by vibrations of the needle bearing 46a is part of tooth hammer noise generated by engagement between the pinion gear 45a and the driven gear 44.

As illustrated in FIG. 6B, when an axial repulsive force Pa is generated in the pinion shaft 45 of the pressurizing member 70, an axial component of a bearing counterforce Prg generated on the ball bearing 46b increases in a direction opposite to the repulsive force Pa. Thus, a counterclockwise moment Mp of the bearing counterforce Prg with respect to origin O illustrated in FIG. 6B increases. The term "counterclockwise" herein refers to a counterclockwise direction in the drawing. Balance of the moment Mp reduces the needle counterforce Pn that is a counterclockwise moment Mp also relative to the origin O. Consequently, as compared to the state (i.e., the state including no pressurizing member 70) illustrated in FIG. 6A, displacement of the pinion shaft 45 in the needle bearing 46a decreases. Thus, vibrations of the needle bearing 46a are reduced, and tooth hammer noise generated by engagement between the pinion gear 45a and driven gear 44 (see FIG. 5) is reduced.

Figure 7A:
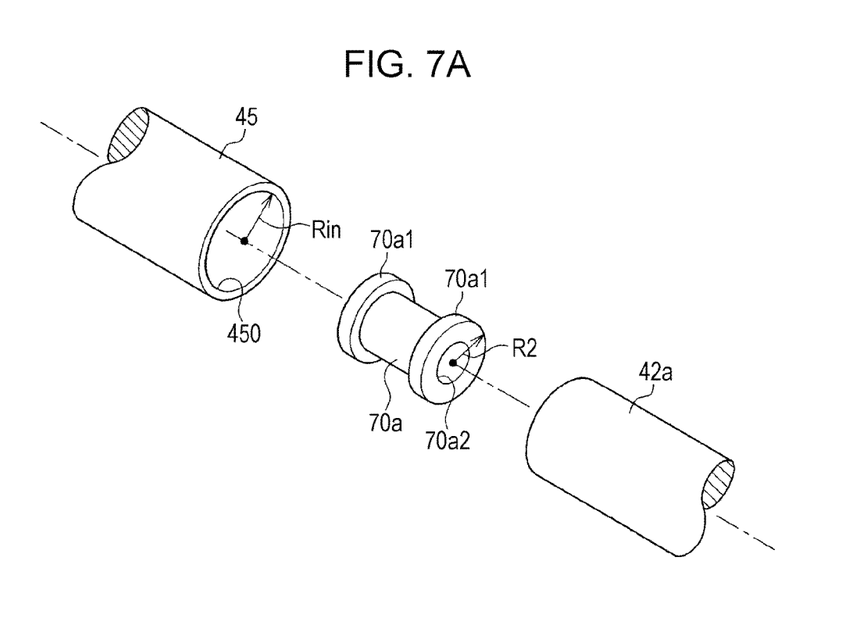
FIG. 7A illustrates an example of design change of the pressurizing unit that has a cylindrical shape whose both ends are enlarged.
Figure 7B:
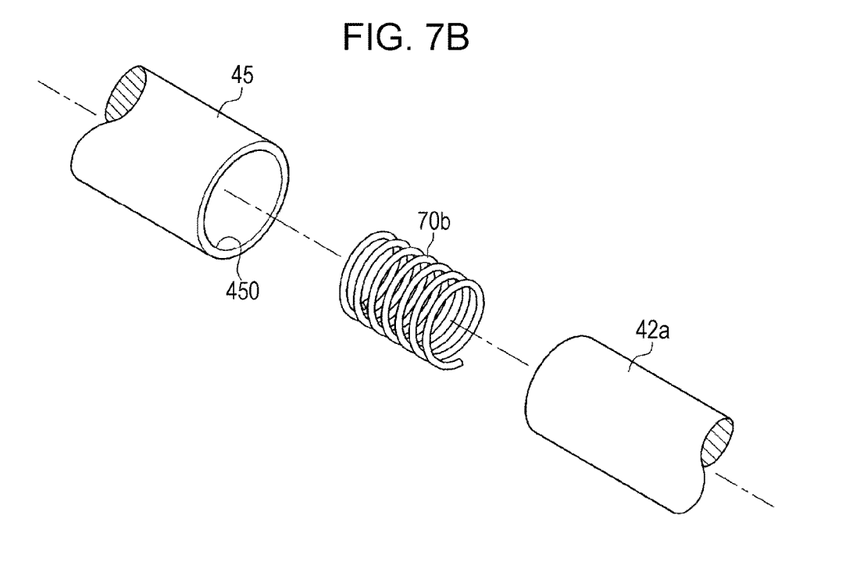
FIG. 7B is an example of design change of the pressurizing unit that is a compression spring.

Design of the present disclosure may be modified within the scope of the present disclosure. For example, the pressurizing member 70 is not limited to the shape illustrated in FIG. 4A. FIGS. 7A and 7B are views showing examples of design change of the pressurizing unit. FIG. 7A shows a cylindrical pressurizing unit whose both ends are enlarged. FIG. 7B shows an example in which a compression spring is used as the pressurizing unit. As illustrated in FIG. 7A, the pressurizing member 70 may be a cylindrical pressurizing member 70a having enlarged portions 70a1 at both ends. In this case, the outer diameter (radius R2) of the enlarged portion 70a1 is preferably equal to the inner diameter (radius Rin) of the vertical hole 450 of the pinion shaft 45 (i.e., radius R2=radius Rin). A through hole 70a2 may penetrate the center of the pressurizing member 70a.

As illustrated in FIG. 7B, a compression spring 70b may be included as a pressurizing unit. Repulsive forces Pa (see FIG. 5) may be generated on the pinion shaft 45 and the motor shaft 42a by deforming the compression spring 70b under compression by the motor shaft 42a in the vertical hole 450 of the pinion shaft 45.

What is claimed is:

1. A linear actuator comprising:
   a motor having an output shaft which has an axial direction;
   a pinion shaft having a hole extending in the axial direction, an inner peripheral surface of the hole being serration-coupled to an outer peripheral surface of the output shaft of the motor, thereby being coaxially coupled to the output shaft driven by the motor;
   a driven gear that is engaged with a pinion gear on the pinion shaft;
   a nut that rotates with the driven gear;
   a rod configured to axially move and engaged with the nut by a feed screw mechanism that converts the rotation movement of the nut into the linear movement of the rod; and
   a pressurizing member provided between the output shaft and the pinion shaft in a manner that generates a pressure axially acting between the output shaft and the pinion shaft, wherein
   the pressurizing member has a cylindrical elastic body having at least three ribs that protrude from an outer peripheral surface of the cylindrical elastic body and linearly and axially extend on the outer peripheral surface, an outermost diameter of the cylindrical elastic body including the at least three ribs is equal to an inner diameter of the hole of the pinion shaft, and the pressurizing member is housed in an inner space defined by the hole and the output shaft inserted therein, in which the pressurizing member is pressed and deformed under compression by the output shaft inserted into the hole, thereby generating the pressure.

2. The linear actuator of claim 1, wherein the pressure generated by the pressurizing member causes the output shaft and the pinion shaft to repel each other axially.

3. The linear actuator of claim 1, wherein the at least three ribs are evenly spaced away from each other in a circumferential direction of the pressurizing member.

4. The linear actuator of claim 3, wherein
the at least three ribs are three ribs.

\* \* \* \* \*